(12) United States Patent
von Freyhold et al.

(10) Patent No.: US 6,594,092 B2
(45) Date of Patent: Jul. 15, 2003

(54) OPTICAL OR OPTOELECTRONIC MODULE

(75) Inventors: Thilo von Freyhold, Jena (DE); Jürgen Wolf, Schlöben (DE); Torsten Scheller, Jena (DE)

(73) Assignee: Unique - M.O.D.E. A.G., Jenna (DE)

( * ) Notice: Subject to any disclaimer, the term of this patent is extended or adjusted under 35 U.S.C. 154(b) by 0 days.

(21) Appl. No.: 09/839,033

(22) Filed: Apr. 20, 2001

(65) Prior Publication Data

US 2003/0007258 A1 Jan. 9, 2003

(30) Foreign Application Priority Data

Apr. 5, 2001 (DE) .......................... 101 17 020

(51) Int. Cl.[7] .............................................. G01B 11/25
(52) U.S. Cl. ........................................................ 359/819
(58) Field of Search ................................ 359/811, 819, 359/822; 385/137

(56) References Cited

U.S. PATENT DOCUMENTS

| | | | |
|---|---|---|---|
| 4,818,053 A | 4/1989 | Gordon et al. | 385/93 |
| 4,997,279 A | 3/1991 | Gordon et al. | 356/153 |
| 5,113,404 A | 5/1992 | Gaebe et al. | 372/36 |
| 5,737,133 A * | 4/1998 | Ouchi et al. | 359/819 |

FOREIGN PATENT DOCUMENTS

DE 43 13 493 A1 5/1994

* cited by examiner

Primary Examiner—Ricky Mack
(74) Attorney, Agent, or Firm—Young & Basile, P.C.

(57) ABSTRACT

Optical or optoelectronic module with an optical bench and a laser diode or group of laser diodes located on its top side and first optical and optoelectronic elements positioned sequentially in the direction of the main beam of at least one of the laser diodes, which include at least a focusing lens as well as an optical fiber with two optical end surfaces where the first optical and optoelectronic elements are located in at a first element holder and with the first element holder jointly form a first optical and optoelectronic module, a first assembly holder is located on the top side of the optical bench. The first optical and optoelectronic elements on the element holder are jointly adjustable in the beam path of the light emitted by at least one laser diode and the element holder is located on the assembly holder in such a way that the first optical and optoelectronic elements located on the first element holder are in the beam path of the light emitted by at least one laser diode, and the focusing lens injects light emitted by at least on laser diode into the first optical end surface of the optical fiber.

77 Claims, 11 Drawing Sheets

OPTICAL OR OPTOELECTRONIC MODULE

BACKGROUND OF THE INVENTION

The present invention relates to an optical or optoelectronic module, of the type used, for example, as a source of signals which are transmitted over optical fibers. By means of modules of this type, emitted light from a semiconductor laser is fed into optical fibers, which is required for applications in the areas of telecommunications, for example, pumping lasers, printing and photographic technology, materials processing, medical technology, illumination and display technology, metrology or analytics.

Optical modules of this type are disclosed, for example, in publications U.S. Pat. Nos. 4,818,053 and 4,997,279. Each of them shows an optical bench on which a semiconductor laser, an optical fiber and a focusing lens in a bracket is positioned to transmit the emitted radiation from the semiconductor laser into the optical fiber, where the fiber is mounted in a fiber sleeve. Both the lens and the optical fiber are oriented longitudinally along the optical axis of the beam emitted by the laser.

The adjustment of the two components is carried out in such a way that first of all the focusing lens is adjusted in three stationary degrees of freedom of translation along the optical axis of the beam emitted by the laser. After the lens has been fixed in position, the optical fiber in turn is adjusted in three degrees of freedom of rotation along the optical axis and fixed in position. The disadvantage here is that the adjustment of the two components is performed sequentially in two separate steps. This requires a high degree of sophistication in the equipment as well as the expenditure of a great deal of time.

SUMMARY OF THE INVENTION

The object of the present invention is to make available an optical or optoelectronic module which can be assembled and adjusted simply and which ensures a precise beam pattern during its entire life and even under adverse conditions.

The module under the invention has a first assembly holder as well as a first element holder, where at least one focusing lens and an optical fiber are located on the first element holder in appropriately shaped seats. This array can be set up without any adjustment. The first element holder for its part is located at the first assembly holder, which in turn again is located on an optical bench. The path of the common optical axis of the optical or optoelectronic assembly thus formed is determined by the orientation of the optical axes of the focusing lens, optical fiber and any additional optical and/or optoelectronic components to each other and is thus dependent on the manufacturing tolerances of the element holder. By adjusting the optical assembly in up to three degrees of freedom of translation and up to three degrees of freedom of rotation within a single adjustment step, the optical axes of the assembly and of the beam emitted by the laser diode can be aligned to each other, and the optimal distance of the laser diode to the optical assembly can be set. As a result of this inventive configuration of the optical or optoelectronic array it is possible to locate all the optical and/or optoelectronic components positioned on the element holder jointly in the beam path of the light emitted by the laser diode and thus to obtain/achieve a simple and correct adjustment of the optical or optoelectronic module.

The first element holder and the first assembly holder are advantageously formed in such a way that the first element holder is movable in all degrees of freedom with respect to the optical bench.

One configuration of the assembly holder, for example, is a U-section open at the top between the flanges of which the element holder is located. The distance between the two flanges is dimensioned such that only a small gap remains on both sides of the element holder between the element holder and the flanges. During the process of adjustment and locking in position, the element holder is held, for example, by a gripping device which is mounted on a positioning system. By means of this positioning system, which can moved advantageously in 6 axes, the element holder and thus the optical module are adjusted for position. Because of its particular configuration, the first assembly holder is moved as well on the assembly surface of the optical bench during the positioning procedure for the first element holder, so that a subsequent adjustment of the assembly holder is not necessary.

After adjustment has been completed, the first element holder can be locked in position in the assembly holder with adhesive, and the assembly holder can be held in position on the optical bench. In this process, the first element holder is held in position only laterally against the flanges of the assembly holder, and the assembly holder is only held in place with its underside on the assembly surface of the optical bench. The open space between the first element holder and the upper side of the base plate of the first assembly holder is advantageously not filled with adhesive.

Because of the special configuration of the assembly holder and of the element holder, the gaps between the first element holder and the first assembly holder are extremely narrow, and so only a small gap has to be bridged with adhesive. The result is that material shrinkage of the adhesive during curing is negligibly small. As a consequence, the adjustment of the element holder in the assembly holder remains unchanged even after the adhesive has cured.

Some examples of optoelectronic modules under the invention are given in the ensuing descriptions.

DETAILED DESCRIPTION OF THE PREFERRED EMBODIMENT

Figure 1:
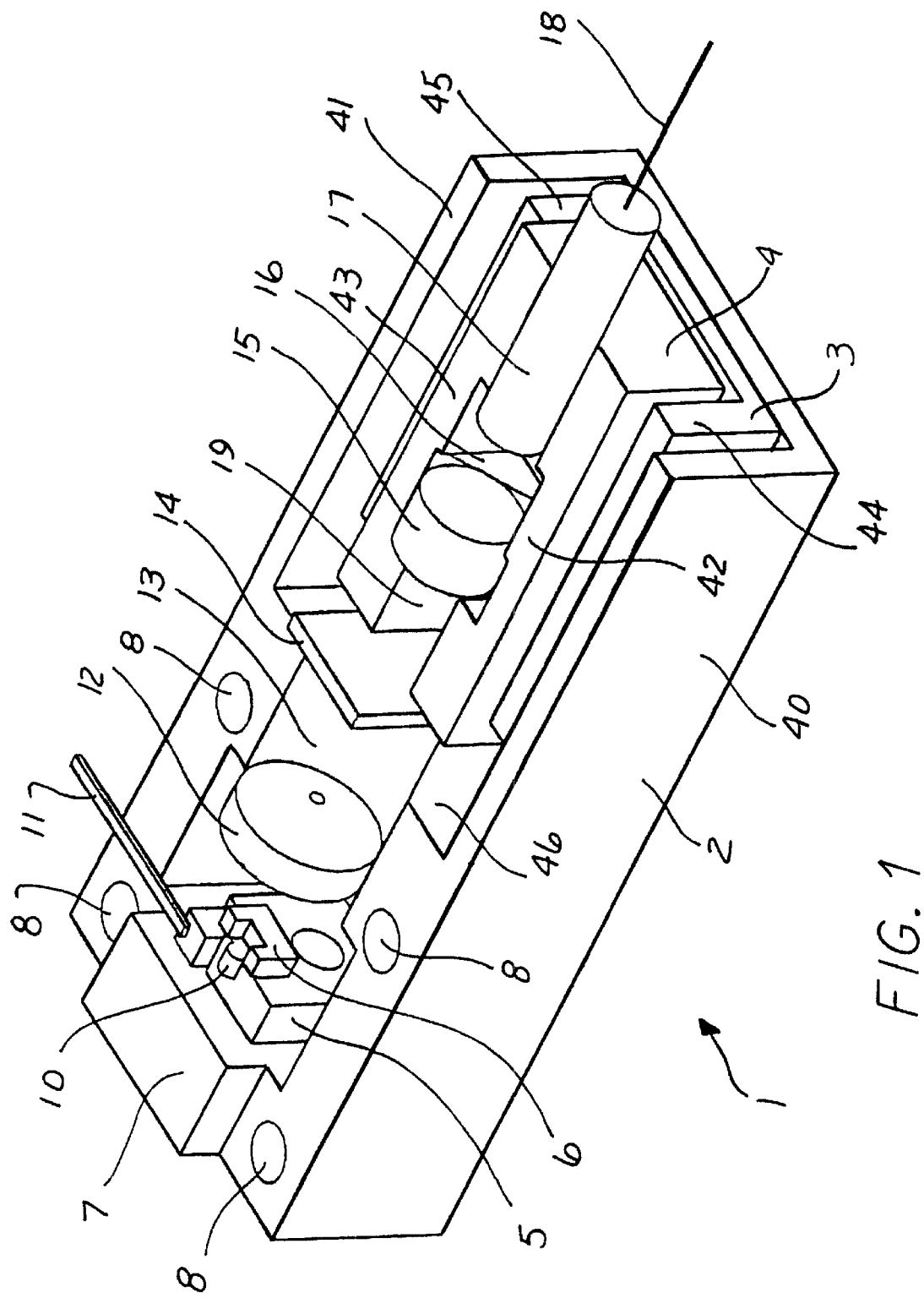
FIG. 1 shows an optical or optoelectronic module under the invention.

FIG. 1 shows an optoelectronic module 1 with a first optical bench 2 (base element). This first optical bench 2 has a U-shaped section, on the two sides of which flanges 40, 41 form an opening open to the top. This U-section is closed off at the rear by a wall 7 extending between the two flanges 40, 41 and it has a diode bracket 5 on which a semiconductor diode 10 is attached. This semiconductor diode 10 is connected by electrical lead 11 to control and power supply equipment. This laser diode 10 emits light in the direction of the U-section and in this way it defines the beam path of the optoelectronic array. An FAC lens, a Fourier lens 12, a refracting element 14, a focusing lens and an optic fiber 18 are positioned in this optoelectronic array immediately after the semiconductor laser 10. The entire array is adjusted in such a way that the light emitted by the semiconductor laser 10 is injected into the optical fiber 18. The FAC lens is not shown in the present FIG. 1. It is bonded to an FAC holder 6, which is also shaped as a U-section, through whose opening the beam emitted from the semiconductor laser 10 passes. The Fourier lens 12 is located in a recess 13 which in turn is located inside a bridge 46 which runs perpendicular to the U-section between the two flanges 40, 41. In the direction of the beam behind the Fourier lens 12 there is another U-section 3 (assembly holder) running parallel to the U-section of the first optical bench with flanges 44 and 45, in which an element holder, i.e. a second optical bench 4 is located. This optical bench 4 is also essentially shaped in the form of a U-section, through which the light beam emitted by the semiconductor diode 10 passes. A refracting element 14 is bonded to the face of the element holder 4 facing the laser diode 10. In the recess 16 or 26 there is either a focusing lens 15 or a fiber sleeve 17, which encloses the optical fiber 18. The recesses are formed in such a way that the focusing lens 15 and the optical fiber 18 are optimally adjusted to each other.

Under the invention, the element holder 4 is assembled first with the optical elements positioned on it, refracting element 14, focusing lens 15 and optical fiber 18 with fiber sleeve 17. After these elements have been adjusted and attached, adhesively bonded for example, the Fourier lens 12 and the FAC lens are adjusted for position in the optical bench 1 and attached. Then the element holder 4 is placed in the U-section 3, and the U-section 3 is placed in the first U-shaped optical bench 1. The element holder 4 is held with a gripping device and adjusted. As soon as all the optical elements 14, 15 and 18 are optimally positioned in the semiconductor laser beam path, the element holder 4 is bonded in this position into the U-section 3 and the U-section 3 is bonded onto the first optical bench 1.

The optical bench 1 itself can then be bolted into a housing. For this purpose there are bolt holes 8 in the first optical bench 1 through which the bolts can be inserted into a lower housing section and tightened.

Figure 2:
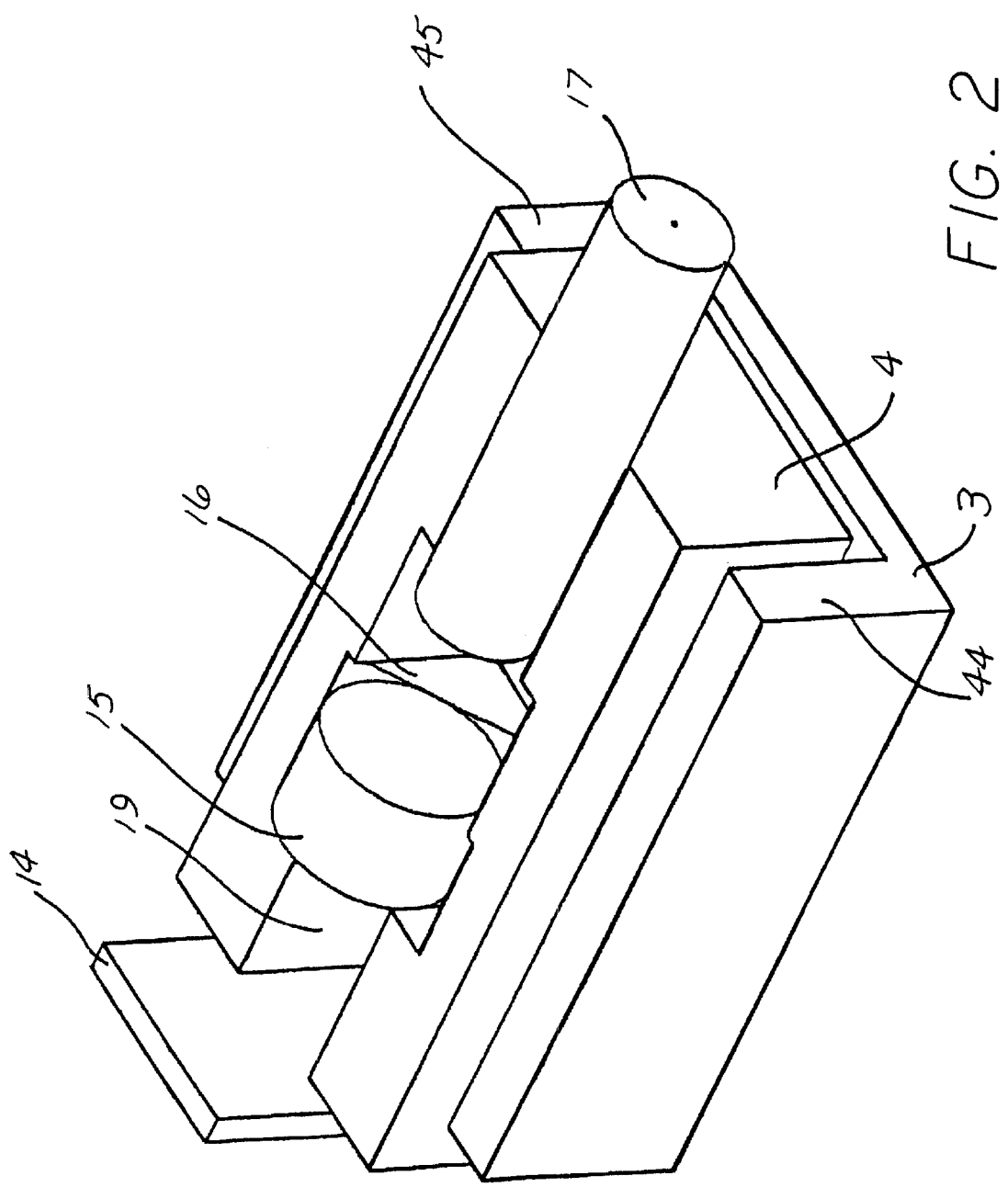
FIG. 2 shows the element holder as shown in FIG. 1.

FIG. 2 shows how the element holder 4 is located within the U-section 3 with its two flanges 44 and 45. Here, as in the following figures, similar reference numerals as in FIG. 1 are used for similar elements.

Figure 3:
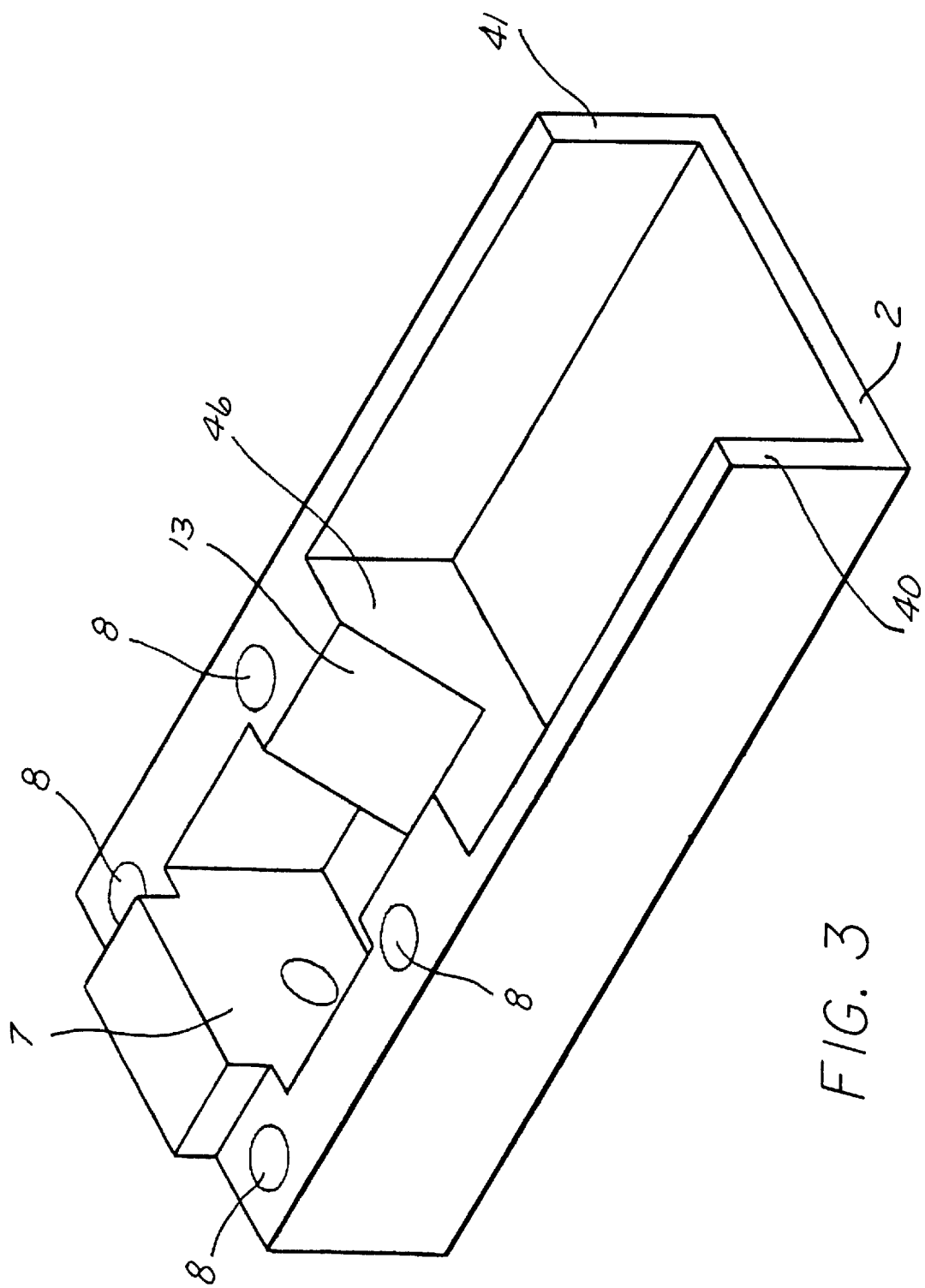
FIG. 3 shows the first optical bench as shown in FIG. 1.

FIG. 3 shows the first optical bench 1 with the rearward closure 7, on which the holder for the laser diode can be located and on which in turn the FAC lens can be located. This can be done by bolting, welding, soldering and/or adhesive bonding. In addition, the bridge 46 can be seen, which extends between the two flanges 40 and 41 of the U-shaped optical bench 1. This bridge 46 has a V-shaped recess 13 to receive the Fourier lens 12 from FIG. 1.

Figure 4:
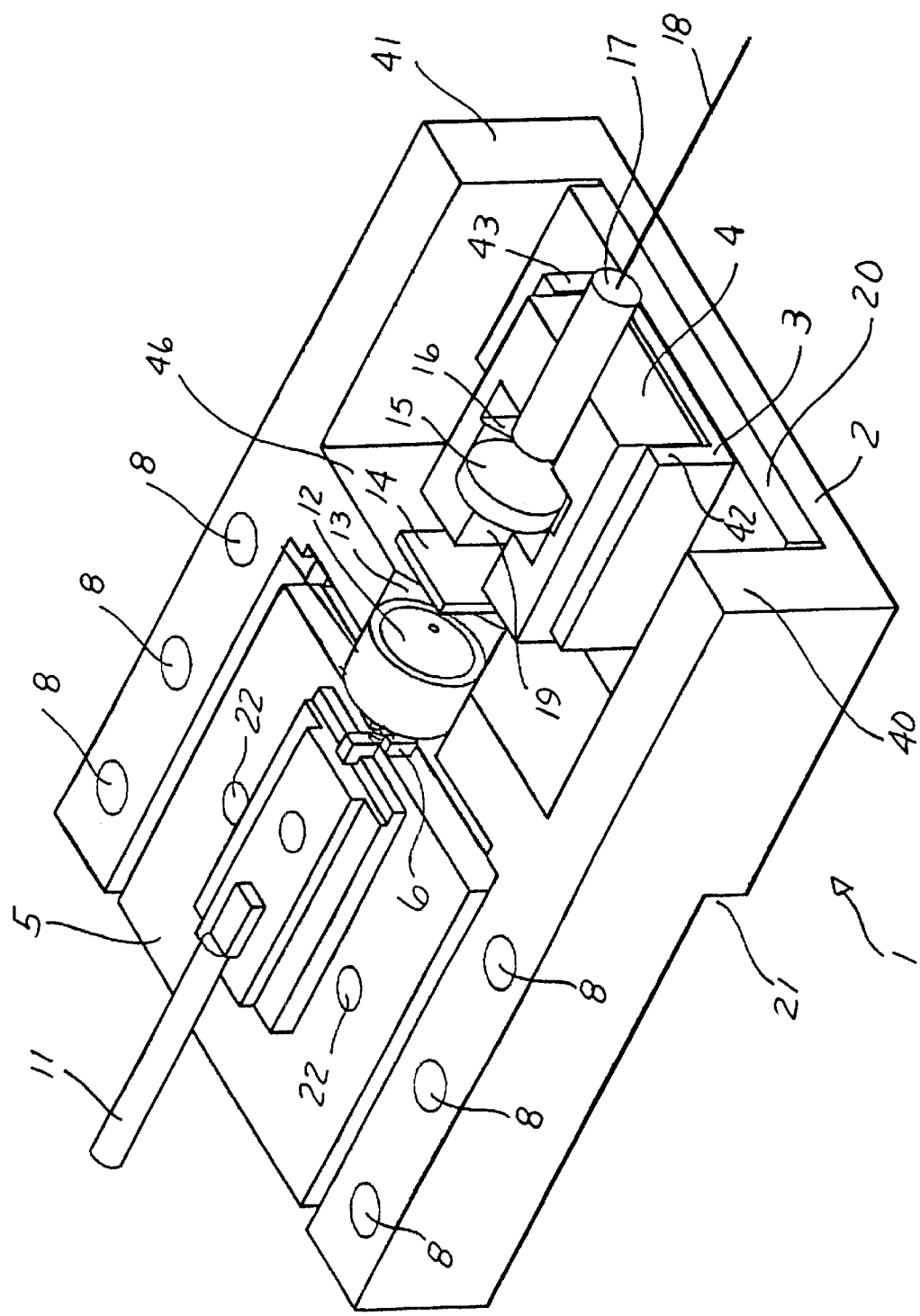
FIG. 4 shows an additional optoelectronic module.

FIG. 4 shows another example of an optoelectronic module 1 with a primary optical bench 2 (base element) and a second optical bench 4 (element holder). In contrast to FIG. 1, the element holder 4 is now located in a U-section 3 with flanges 42 and 43, which enclose the element holder 4 on both sides, where the U-section 3 for its part is located on a assembly plate 20 (assembly base), which is located between the two flanges 40 and 41 of the U-shaped area of the first optical bench 2. Here too another bridge 46, which has a V-shaped recess 13 to position Fourier lens 12, extends between the two flanges 40 and 41. The semiconductor diode is now located on a diode holder 5, which is attached to the first optical bench 2 by means of bolt holes 22. The first optical bench 2 has a step 21 on its underside, shaped in such a way that the underside of the first optical bench 2 is higher in the area of the laser diode than in the area of the second optical bench 4. The effect of this step 21 is that a cooling element, for example a Peltier element, can be attached from below to the first optical bench 2 in the area of the laser diode, where, if the height of the step and the height of the Peltier element coincide, the underside of the optical bench runs flush and even with the Peltier element. A space for thermal insulation, which can be filled with a stability-promoting, thermally insulating material, should always be left between the underside of the first optical bench 1 and the bottom of a housing.

Figure 5:
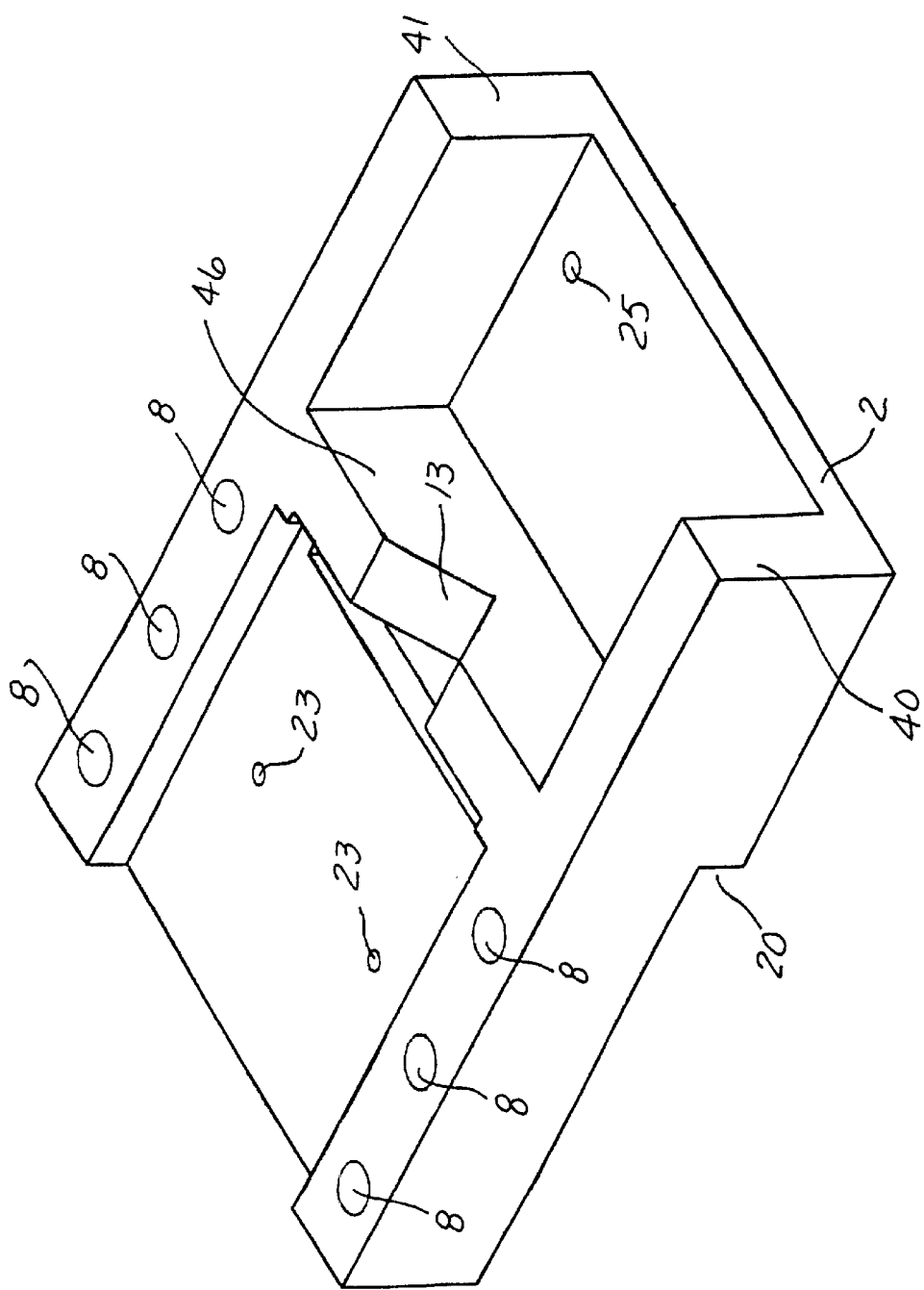
FIG. 5 shows the first optical bench as shown in FIG. 4.

FIG. 5 shows the first optical bench 2, where the corresponding bolt holes 23 can now be seen, which match the bolt holes 22 in the diode holder 5. In the same way, bolt holes 25 can be seen, by means of which the assembly base 20 in the first optical bench can be attached in the first optical bench.

Figure 6:
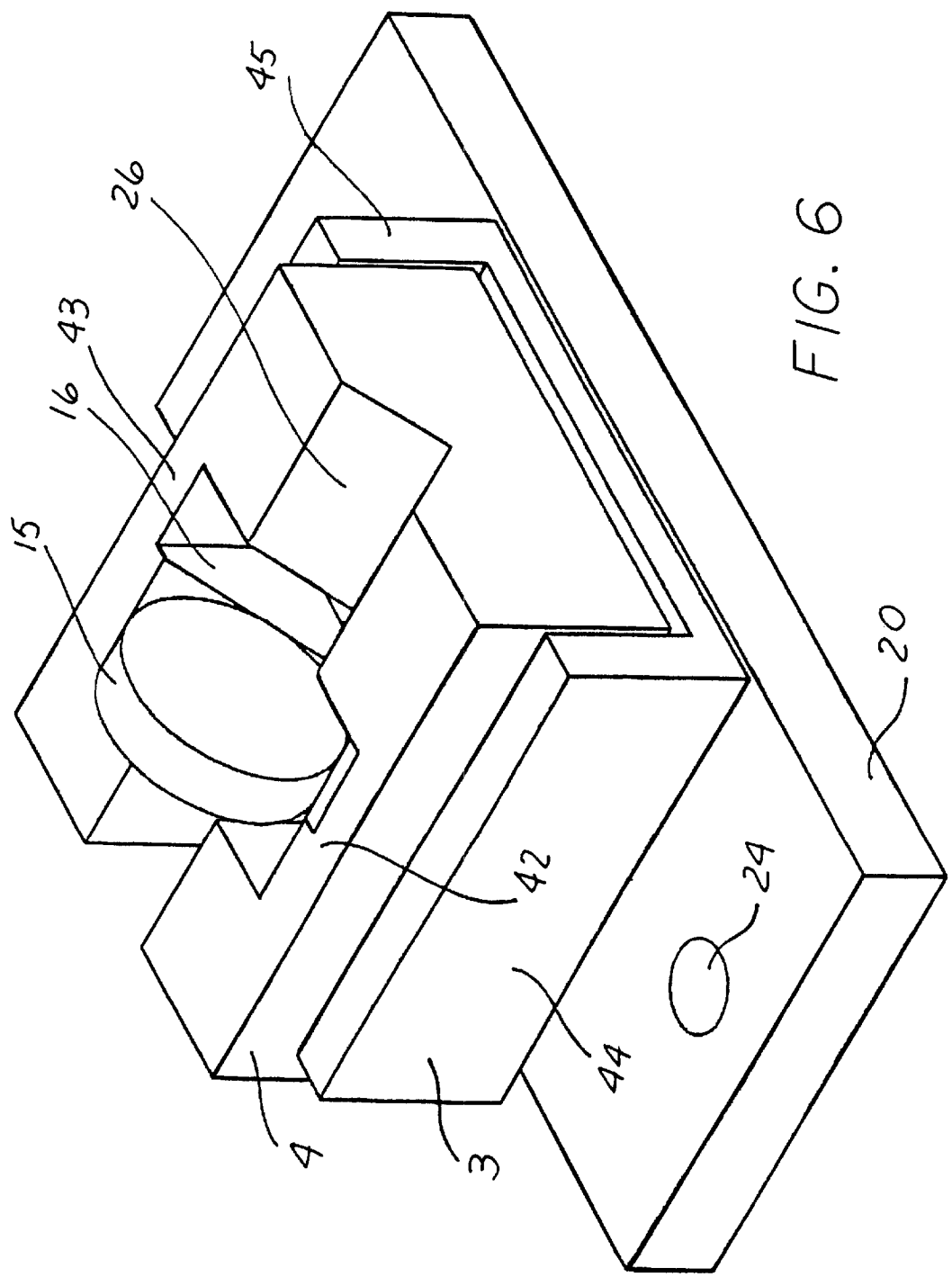
FIG. 6 shows the element holder as shown in FIG. 4.

FIG. 6 shows the assembly base 20 with its bolt holes 24, which match the bolt holes 25. The U-section 3 and the second optical bench 4 are located on this assembly base, where the second optical bench 4 and the U-section 3 are dimensioned in such a way that the second optical bench 4 is partially enclosed on its two long sides, viewed in the direction of the beam, by the flanges 44 and 45 of the U-section 3. The rest of the construction of the second optical bench 4 is as described previously under FIG. 2. In FIG. 6 only the focusing lens 15 is shown in its mount 16, while the refracting element 14 and the fiber sleeve 17 are not shown.

Figure 7:
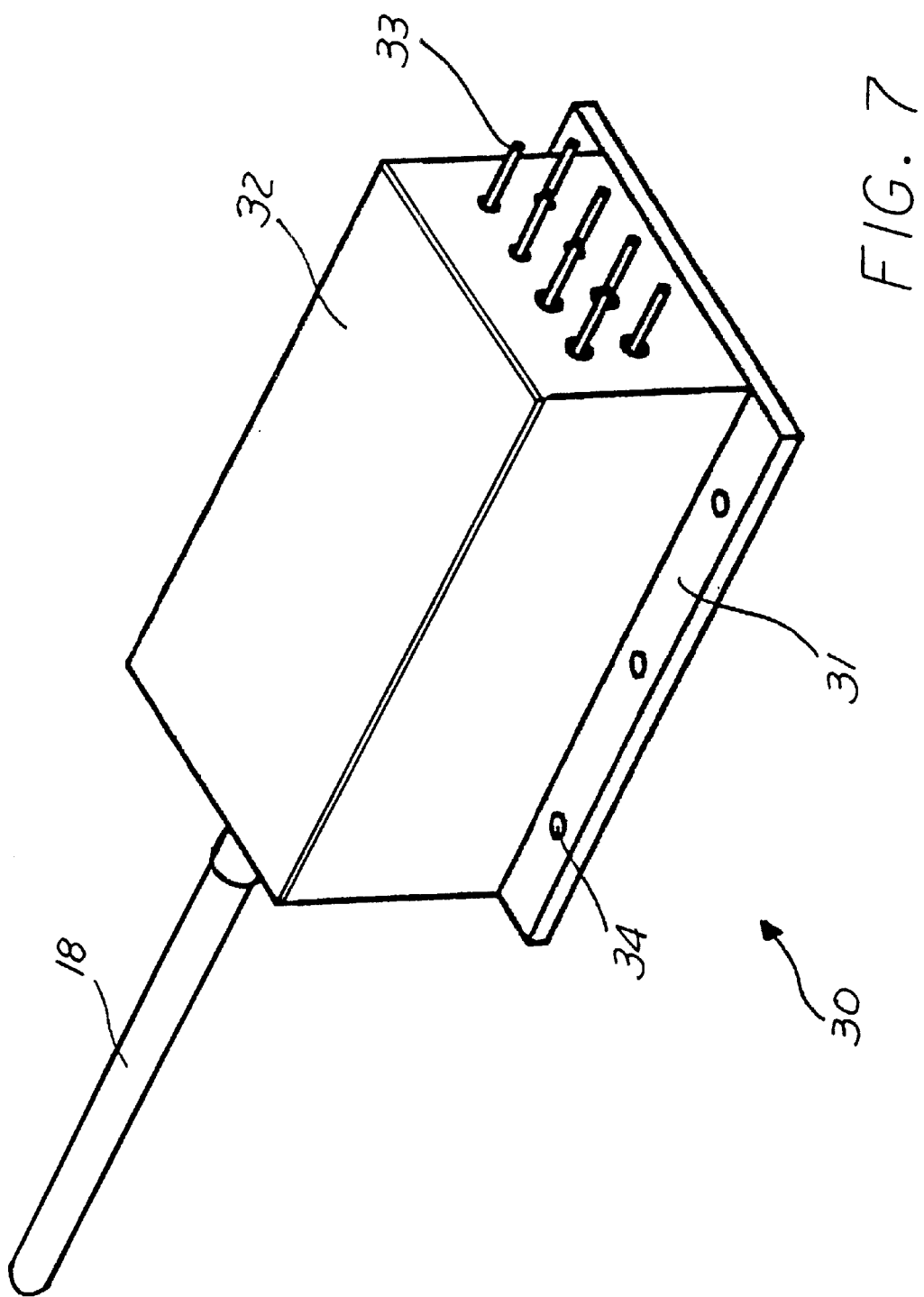
FIG. 7 shows the housing of an optoelectronic module under the invention.

FIG. 7 shows a housing of the type that can be used for an optoelectronic component according to the invention. This housing 30 has a housing base 31, consisting of a base plate, on which there is a housing cover 32, and four side pieces. The base plate of the housing base 31 has bolt holes 34, which can be used to bolt the housing 30 securely to a supporting base. In addition, the housing base 31 has lateral openings through which the optical fiber 18 is run on one side and the electrical leads 33 to the laser diode are run on the opposite side. The housing cover 32 is hermetically attached to the housing base, for example by means of welding or soldering. If the openings of the passages are properly sealed and the interior of the housing 30 is filled with inert gas, the result is a completely maintenance-free and very long-lived optoelectronic component.

Figure 8:
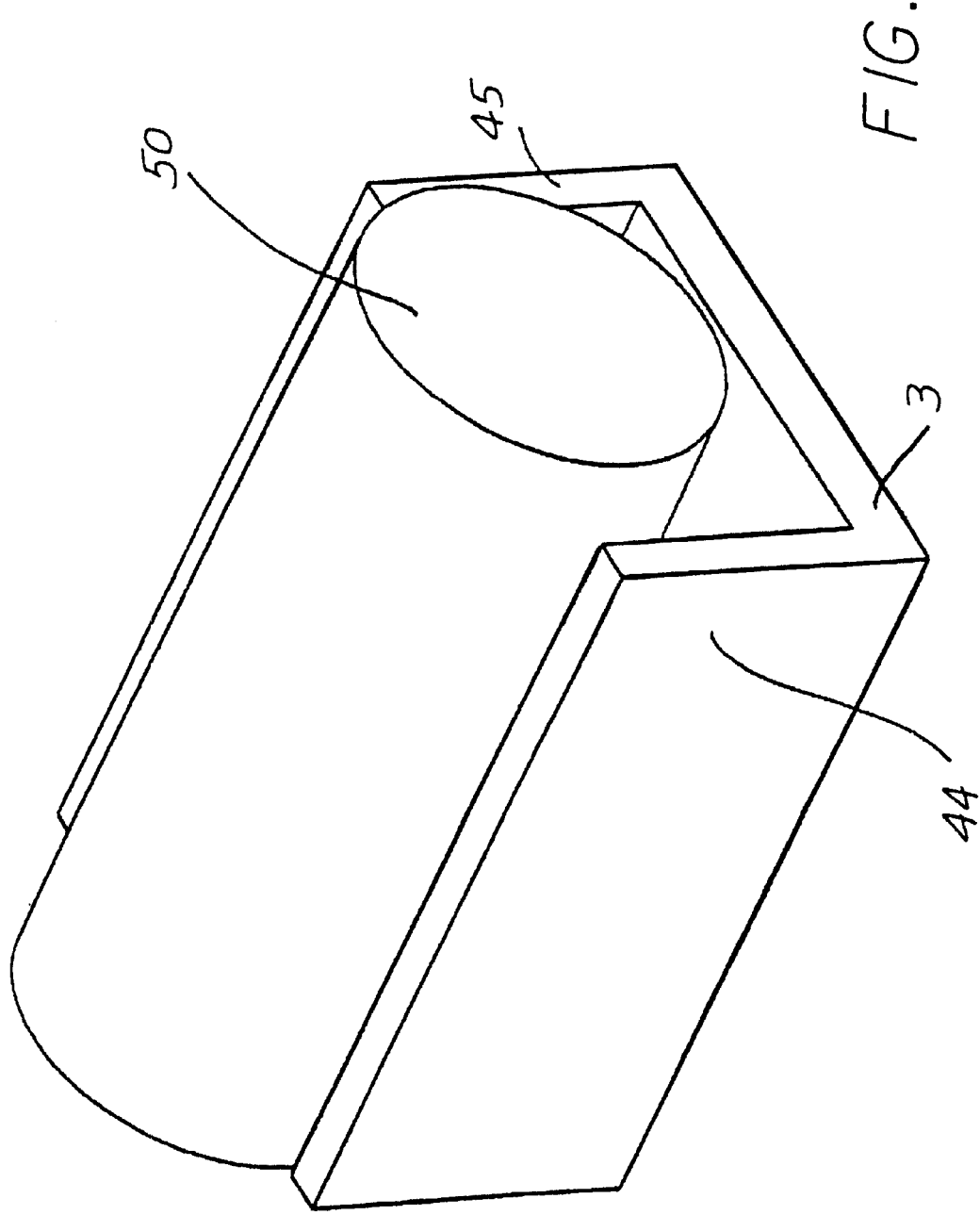
FIG. 8 shows the assembly holder under the invention with optical or optoelectronic assembly.

FIG. 8 shows an assembly holder 3, on which a schematically indicated optical assembly 50 is located. The assembly holder 3 has a U-shape, where the two flanges 44 and 45 have sufficient distance between them that the optical assembly 50 with a predetermined diameter can be positioned between them.

Figure 9A:
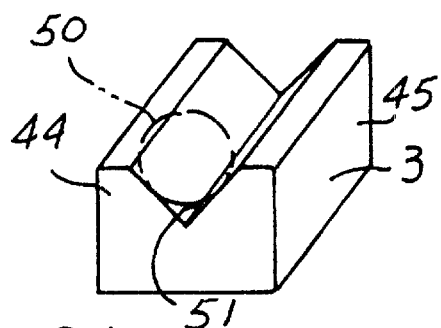
FIGS. 9A–9X show additional assembly holders under the invention.
Figure 9B:
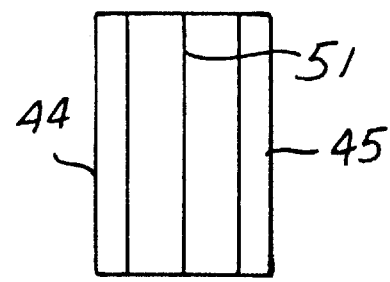
Figure 9C:
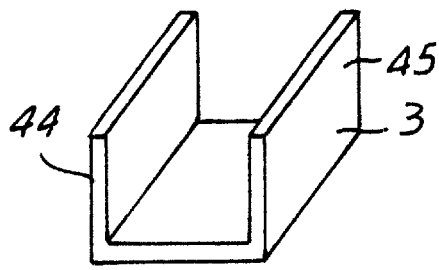
Figure 9D:
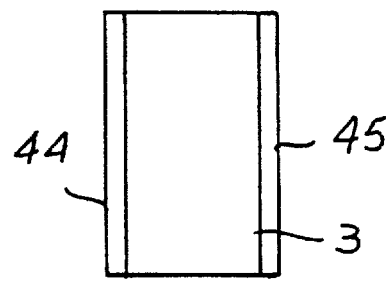
Figure 9E:
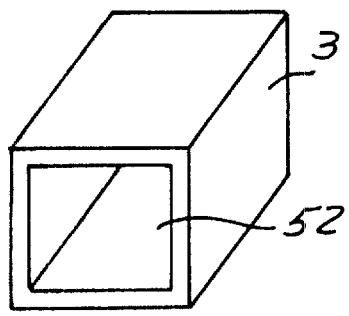
Figure 9F:
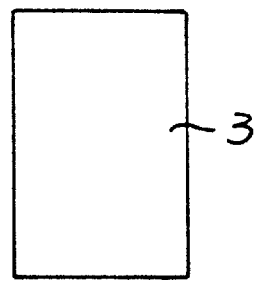
Figure 9G:
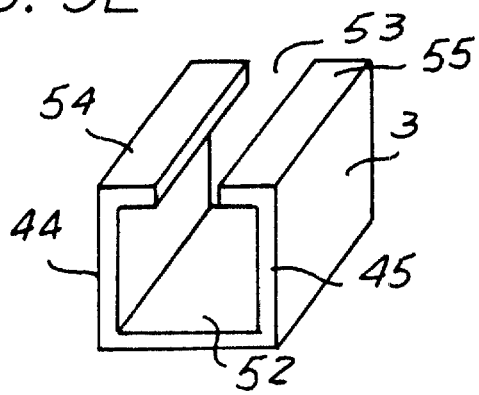
Figure 9H:
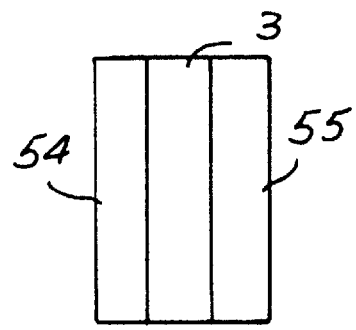
Figure 9I:
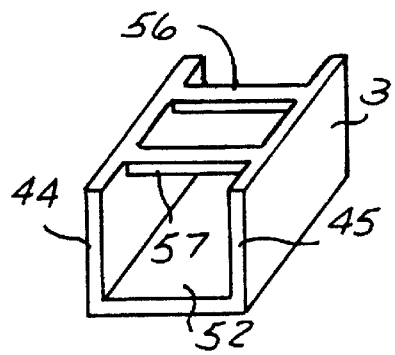
Figure 9J:
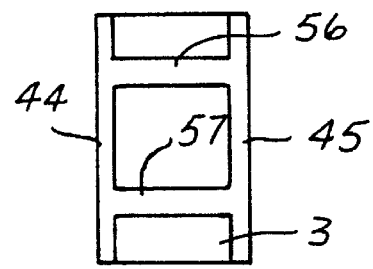
Figure 9K:
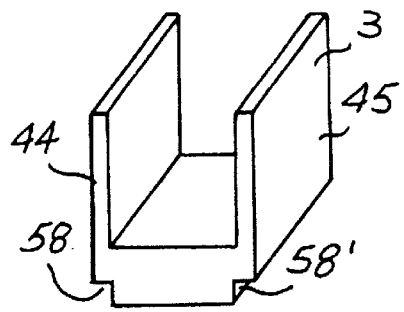
Figure 9L:
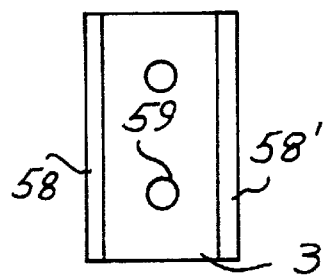
Figure 9M:
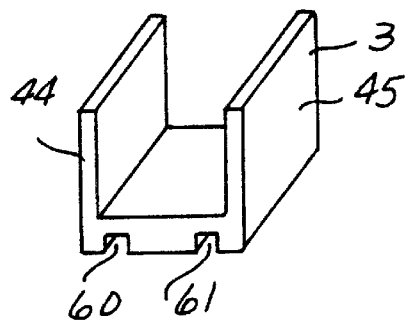
Figure 9N:
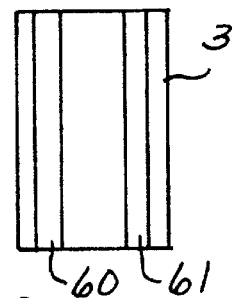
Figure 9O:
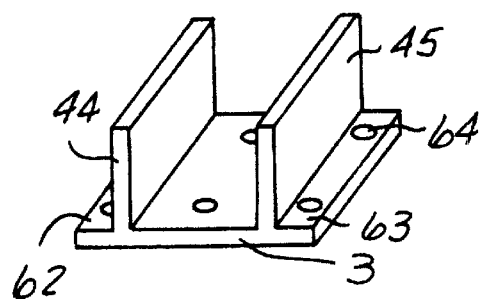
Figure 9P:
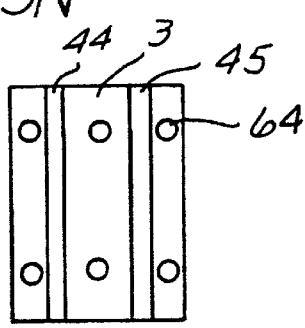
Figure 9Q:
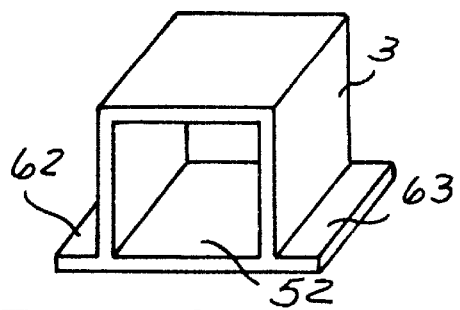
Figure 9R:
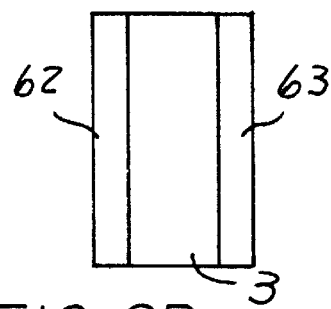
Figure 9S:
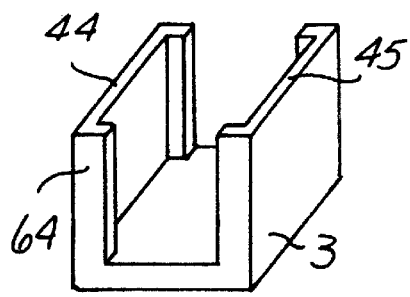
Figure 9T:
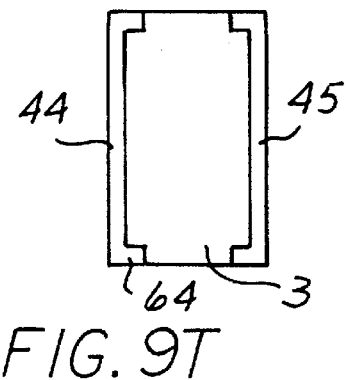
Figure 9U:
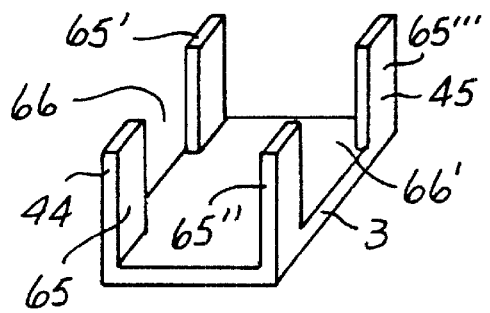
Figure 9V:
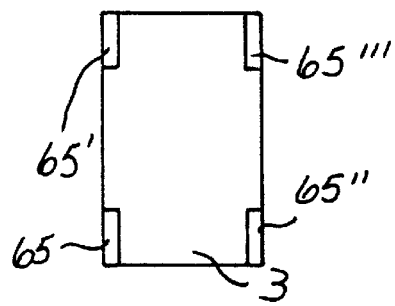
Figure 9W:
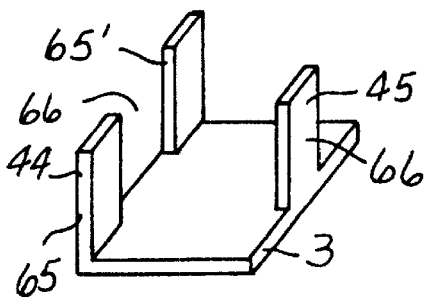
Figure 9X:
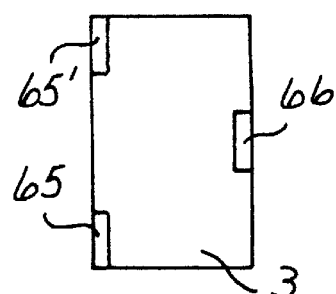

FIGS. 9A–9X show different forms of the assembly holder 3 according to the invention.

FIGS. 9A and 9B show an assembly holder 3 with two flanges 44 and 45, extending between which is a V-shaped notch 51. This V-shaped notch 51 positions an assembly 50 (shown in phantom) with a cylindrical external shape. The V-shaped notch extends from one end of the assembly holder 3 to the other end, where the assembly 50 can be rotated around its cylindrical axis in this V-shaped lengthwise opening. In FIG. 9A an isometric view of the assembly holder is shown. FIG. 9B shows a top view of the assembly holder.

FIG. 9C shows the assembly holder 3 in the shape of a U-section with flanges 44 and 45, where FIG. 9D shows a top view.

In FIG. 9E the assembly holder 3 has the shape of a square tube with a lengthwise opening 52 running from one end of the assembly holder 13 to the other end in the axial direction. In the partial illustration in FIG. 9F, a top view of this assembly holder 3 is shown.

FIG. 9G shows an assembly holder which also has the same basic shape of a square tube as shown in FIG. 9E. In contrast to FIG. 9E, the square tube is not completely closed in the horizontal axial direction, but has an opening 53 connecting the lengthwise passage 52 to the outside. A gripping device can be inserted through this opening 53 in order to hold the optical or optoelectronic component in position in the assembly holder during adjustment and attachment to the assembly holder. In each instance only one flange 54 and 55 remains of the top periphery of the assembly holder 3. FIG. 9H shows a top view of the assembly holder 3.

FIG. 9I shows a U-shaped assembly holder 3, as depicted in FIG. 9C, where however the two flanges 44 and 45 are connected to each other by means of cross-bridges 56, 57 which run perpendicular to the axial direction from one lip of one flange 44 to the lip of flange 45. Openings remain between the two bridges 56, 57 or adjacent to them, through which a gripping device can be inserted. The assembly holder from FIG. 9I of which a top view is shown in FIG. 9J, can also be lifted from a magazine together with the assembly being held by means of the gripping device in the lengthwise opening formed by the flanges 44 and 45 and placed on the assembly surface.

FIGS. 9K–9N also show U-shaped assembly holders 3, as in FIG. 9E in isometric view FIGS. 9K and 9M and viewed from below. FIGS. 9L and 9N, respectively. The underside of the assembly holder is non-planar and has, for example in FIGS. 9M and 9N, channels 60 and 61 running in the axial direction, or in FIGS. 9K and 9L rabbets 58, 58$^1$ running in the axial direction. As is shown in FIG. 9L two or three countersunk holes 59 are provided on the underside of the assembly holder, which for example act as soldering reservoirs or for holding adhesive.

FIG. 9O similarly shows a U-shaped section 3 as an assembly holder, where the base of the U-section projects at the sides of the two flanges 44 and 45. These projections 62, 63 have furthermore vertical passages or vertical counterbores 64 on their upper side, which also make attachment of the assembly holder to the surface easier, for example by being filled with adhesive or solder or by spot welding.

This is also shown in FIG. 9P as a bottom view of the assembly holder 3. FIG. 9Q shows an assembly holder as in FIG. 9E, where in this instance however the underside of the assembly holder also projects beyond the two side walls of the square section. These projections 62, 63 can also be seen in the top view of FIG. 9R.

As can be seen in FIG. 9S, the inner side of the passage, i.e. the inner side of the flanges 44, 45 can be non-planar. In FIG. 9S the flanges 44, 45 have extensions 64 at their at each of their axial end surfaces. This can also be seen in the FIG. 9T, the top view of the assembly holder 3.

FIGS. 9U–9X also show U-shaped assembly holders 3, where however the flanges 44, 45 have openings 66, so that upright flange pieces, 65, 65', 65", and 65''', are standing only at the four corners of the base plate of the assembly holder 3. In FIG. 9W two flange pieces 65, 65' remain from the flange 44 on one side of the assembly holder 3, while from the right flange 45 only the center piece which is located opposite the opening 66 remains. In this way better accessibility is created for holding an optical or optoelectronic component in place. Top views of FIGS. 9U and 9W are shown in FIGS. 9V and 9X respectively.

The examples from FIGS. 9A to 9X are intended solely as exemplars, while it must be pointed out that any combination at all of the elements shown there with each other is possible.

What is claimed is:

1. Optical or optoelectronic module with an optical bench and a laser diode or group of laser diodes located on its top side and at least one group of first optical elements, optoelectronics elements, and optical and optoelectrical elements positioned sequentially in the direction of the main beam of at least one of the laser diode, which include at least a focusing lens as well as an optical fiber with two optical end surfaces where the at least one group of first optical elements, optoelectronics elements, and optical and optoelectrical elements are one of located in and located against a first element holder and with the first element holder jointly form at least one of a first optical and optoelectronic module, a first assembly holder is located on the top side of the optical bench the at least one group of first optical elements, optoelectronics elements, and optical and optoelectrical elements on the element holder are jointly adjustable in the beam path of the light emitted by at least one laser diode and the element holder is located on the assembly holder in such a way that the at least one group of first optical elements, optoelectronics elements, and optical and optoelectrical elements located on the first element holder are in the beam path of the light emitted by at least one laser diode, and the focusing lens injects light emitted by at least one laser diode into the first optical end surface of the optical fiber.

2. Module in accordance with claim 1, wherein except for the focusing lens and the optical fiber additional at least one group of first optical elements, optoelectronics elements, and optical and optoelectrical elements are one of located in and located against the first element holder.

3. Module in accordance with claim 1, wherein several or all of at least one group of first optical elements, optoelectronics elements, and optical and optoelectrical elements assigned to an element holder are fixed in position in or against the element holder before the element holder is installed into the assembly holder.

4. Module in accordance with claim 1, wherein additional optical benches with laser diodes are provided, which are in optical contact with the said optical bench.

5. Module in accordance with claim 4, wherein the first element holder and the first assembly holder are formed in such a way that the first optical or optoelectronic modules are one of located in and located on the first element holder can be adjusted in at least three degrees of freedom and of translation and two degrees of freedom of rotation with respect to the beam emitted from at least one laser diode.

6. Module in accordance with claim 2, wherein the first element holder and the first assembly holder are formed in such a way that the element holder, together with the optical or optoelectronic modules which are one of located in and located on it, can be adjusted in two degrees of freedom of translation and two degrees of freedom of rotation with respect to the beam emitted from at least one laser diode.

7. Module in accordance with claim 2, wherein the first element holder and the first assembly holder are formed in such a way that the element holder, together with the first optical or optoelectronic modules which are one of located in and located on it, is adjustable in three degrees of freedom of translation and two degrees of freedom of rotation with respect to the beam emitted by at least one laser diode.

8. Module in accordance with claim 2, wherein the first element holder and the first assembly holder are formed in such a way that the element holder, together with the first optical or optoelectronic components located in or on it is adjustable in three degrees of freedom of translation and two degrees of freedom of rotation with respect to the beam emitted by one at least one laser diode.

9. Module in accordance with claim 1, wherein additional at least one group of first optical elements, optoelectronics elements, and optical and optoelectrical elements are located in the beam path of the light emitted by at one least one laser diode.

10. Module in accordance with claim 1, wherein the optical bench has seats on its top side, in which at least one of additional optical or optoelectronic components, assembly holders and element holders can be located.

11. Module in accordance with claim 10, wherein the seats are formed as at least one of plane bearing surfaces, stepped seating surfaces or rectangular, cylindrical, V-shaped recesses and U-shaped recesses.

12. Module in accordance with claim 10, wherein the additional optical and optoelectronic components are located at least partially in at least one of the first one and several additional element holders, which in turn are located on the optical bench.

13. Module in accordance with claim 12, wherein the additional element holders are at least one of located in seats on the optical bench and are located by means of additional assembly holders on the optical bench.

14. Module in accordance with claim 1, wherein at least one of the first and additional element holders have seats, in which the at least one of the first or additional optical and optoelectronic elements are at least partially located.

15. Module in accordance with claim 1, wherein at least one of the first and additional element holders have seats for additional element holders, in or on which in turn additional one of optical and optoelectronic elements are located.

16. Module in accordance with claim 14, wherein the seats of at least one of the first and additional element holders are formed at least partially as at least one of plane bearing surfaces, stepped seating surfaces or rectangular, cylindrical, V-shaped recesses and U-shaped recesses.

17. Module in accordance with claim 1, wherein the seats are formed in such a way that modules having basically at least in sections at least one of a square and cylinder-shaped outer contour can be positioned in or on them.

18. Module in accordance with claim 17, wherein at least one of the first and the additional element holder(s) are formed as cylindrical tubes with the interior area of the tubes as a seat.

19. Module in accordance with claim 1, wherein at least one of the optical and optoelectronic elements are held in position on at least one of the element holder and in their seats by at least one of cementing, soldering, welding, bonding, clamping and press fitting.

20. Module in accordance with claim 1, wherein the optical benc, the holder and at least one of the first and additional element the first and the additional assembly holder are attached to each other at least partially by at least one of cementing, soldering, welding, bonding, clamping and press fitting.

21. Module in accordance with claim 20, wherein the optical fiber is located on or in the element holder in the area of its first optical end surface.

22. Module in accordance with claim 1, wherein the optical fiber is at least partially enclosed by one or more sleeves.

23. Module in accordance with claim 22, wherein the optical fiber is attached at least partially to at least one of several sleeves by means of at least one of cementing, soldering, welding, bonding, clamping and press fitting.

24. Module in accordance with claim 23, wherein the optical fiber is enclosed by a sleeve in the area where it seats on the element holder.

25. Module in accordance with claim 23, wherein the optical fiber is at least one of hermetically sealed to the sleeve and the sleeve is hermetically sealed to the element holder.

26. Module in accordance with claim 25, wherein the sleeve is attached to the element holder by at least one of cementing, soldering, welding, bonding, clamping and press fitting.

27. Module in accordance with claim 1, wherein an FAC lens is positioned immediately ahead of the primary emitting surface of at least one laser diode and in the beam path of the beam emitted by at least one laser diode.

28. Module in accordance with claim 27, wherein the FAC lens is positioned via a carrier in front of at least one laser diode.

29. Module in accordance with claim 28, wherein the carrier has a U-shape enclosing a recess on the sides, and the FAC lens is located on the holder covering one of the surfaces of the recess surrounded by the two U-shapes.

30. Module in accordance with claim 28, wherein the U-shaped carrier is located in front of the laser diode in such a way that the beam emitted by the laser diode passes through the recess.

31. Module in accordance with claim 28, wherein the carrier has a step in which the FAC lens is located.

32. Module in accordance with claim 28, wherein the FAC lens is attached to the carrier and/or the carrier is attached in front of the laser diode by cementing, soldering, welding and/or bonding.

33. Module in accordance with claim 1, wherein the optical bench has a step on its underside running perpendicular to the direction of the beams emitted by at least one laser diode in such a way that the underside of the optical bench sits lower behind the step in the direction of the beam than in front of the step.

34. Module in accordance with claim 33, wherein the step viewed in the direction of the beam is located in the area between the laser diode and the element holder.

35. Module in accordance with claim 33, wherein a temperature-regulating device is located on the underside of the first optical bench in the direction of the beam ahead of the step.

36. Module in accordance with claim 35, wherein the thickness of the temperature-regulating device is greater than the step height.

37. Module in accordance with claim 34, wherein the temperature-regulating device has a thermoelectric element, for example a Peltier element.

38. Module in accordance with claim 1, characterized by a temperature sensor to determine the temperature of the optical bench.

39. Module in accordance with claim 38, wherein the temperature sensor is located in the immediate vicinity of the laser diode on the optical bench.

40. Module in accordance with claim 1, wherein the optical bench has a seat for the temperature sensor.

41. Module in accordance with claim 38, wherein the temperature sensor is located jointly with at least one laser diode on a diode bracket.

42. Module in accordance with claim 38, wherein the temperature sensor has an electrical shunt.

43. Module in accordance with claim 1, wherein the optical bench is enclosed in a housing or a part of a housing.

44. Module in accordance with claim 43, wherein the housing is hermetically sealed.

45. Module in accordance with claim 1, wherein the housing has a passage for the optical fiber and the optical fiber is enclosed by a fiber sleeve in the area of this passage.

46. Module in accordance with claim 45, wherein the optical fiber is attached to the fiber sleeve and the fiber sleeve to the passage by means of a hermetic seal.

47. Module in accordance with claim 45, wherein the optical fiber is attached to the fiber sleeve and the fiber sleeve is attached to the passage by means of at least one of cementing, soldering, welding, bonding, clamping and press fitting.

48. Module in accordance with claim 47, wherein the optical fiber is curved between the area of the first end surface of the optical fiber and the passage through the housing because the element holder is offset for reasons of adjustment.

49. Module in accordance with claim 43, wherein the housing is filled with an inert gas.

50. Module in accordance with claim 43, wherein a temperature regulating device is located on the outside of the housing for regulating the temperature of the housing.

51. Module in accordance with claim 50, wherein the temperature regulating device has a thermoelectric element, for example, a Peltier element.

52. Module in accordance with claim 43, wherein the optical bench and the temperature regulating device are positioned in the housing in such a way that a gap is provided in the direction of the beam after the step between the underside of the optical bench and the floor of the housing for the purpose of thermally insulating the optical bench from the housing.

53. Module in accordance with claim 43, wherein the housing has:
  a floor of good thermally-conductive metal with a thermal conductivity of more than 100 W(m*K),
  at least four plate-shaped side parts,
  an upper frame, which covers the top edges of the side parts,
  sealed glass passages in at least one side part for electrical connections,
  a passage for the optical fiber in one side part, a cover,
  where the side parts of the housing are brazed to the floor and the upper frame and the cover is attached to the frame either with an additional solder that melts at lower temperature or with an adhesive.

54. Module in accordance with claim 1, wherein the assembly holder with the first optical or optoelectronic assembly is located on an assembly surface of the optical bench moveable in only a first plane of adjustment parallel to the assembly surface and has:
  an assembly base for positioning the assembly holder on the assembly surface as well as
  a seat which is open the entire distance from one outside surface of the assembly holder to the opposite outside surface of the assembly holder, in which the optical or optoelectronic assembly is located and which is formed in such a way that the optical or optoelectronic assembly can be moved relative to the assembly holder only in a second plane of adjustment which is non-parallel to the first plane of adjustment, extending parallel to the directional passage of the seat.

55. Module in accordance with claim 54, wherein the optical or optoelectronic component is at least one of movable and rotatable.

56. Module in accordance with claim 55, wherein the optical or optoelectronic component can be moved relative to the assembly holder only in a second plane of adjustment which is perpendicular to the first plane of adjustment, extending parallel to the directional passage of the seat.

57. Module in accordance with claim 55, wherein the seat is formed as a passage.

58. Module in accordance with claim 1, wherein the underside of the assembly base opposite the seat is formed as a flat surface or at least as a 3-point contact.

59. Module in accordance with claim 54, wherein at least one of the inner side of the seat and the underside of the assembly base opposite the seat is non-planar.

60. Module in accordance with claim 54, wherein at least one of the inner side of the seat and the underside of the assembly base opposite to the seat has cavities.

61. Module in accordance with claim 60, wherein the cavities are formed as grooves.

62. Module in accordance with claim 60, wherein the cavities on at least one of the inner side of the seat and on the underside of the assembly base are filled or can be filled with solder or adhesive.

63. Module in accordance with claim 54, wherein the seat is formed in such a way that the optical or optoelectronic component can be rotated around the optical axis of the component in its installed condition in the seat.

64. Module in accordance with claim 54, wherein the seat is formed in such a way that components with an outside contour which is essentially rectangular or cylindrical, at least in sections, can be positioned in or against it.

65. Module in accordance with claim 54, wherein the assembly holder has a U-section open to the top with a floor and two lateral flanges extending parallel to the directional passage of the seat, where both flanges together with the floor enclose and form the passage on at least three sides.

66. Module in accordance with claim 65, wherein the assembly base is formed at least partially by the floor of the U-section.

67. Module in accordance with claim 65, wherein the assembly base in the plane of the floor extends laterally beyond the two flanges.

68. Module in accordance with claim 65, wherein at least two cross-bridges extend between the two facing longitudinal edges of the two flanges of the U-section.

69. Module in accordance with claim 65, wherein one or both flanges of the U-section are indented in one or more places in the transitional direction.

70. Module in accordance with claim 54, wherein the assembly holder has a square tube open on two opposite sides, whose outer walls define a passage as seat.

71. Module in accordance with claim 70, wherein the assembly base extends laterally beyond the outer walls of the square tube.

72. Module in accordance with claim 70, wherein the square tube has at least one opening along the seat.

73. Module in accordance with claim 54, wherein the assembly base has at least one of vertical bolt holes and indentations on its underside.

74. Module in accordance with claim 73, wherein at least one of the indentations and bolt holes on the underside of the assembly base are filled or can be filled at least partially with solder at least one of and adhesive.

75. Module in accordance with claim 54, wherein the assembly holder or the optical or optoelectronic assembly is coated or can be coated at least partially with solder.

76. Module in accordance with claim 75, wherein the assembly holder is coated or can be coated with solder in the area of at least one of the seat and in the area of the assembly base.

77. Use of a module in accordance with claim 1 in at least one of direct applications and for pumping lasers, in communications technology, micromaterials processing, medical technology, analytics and metrology.

* * * * *